US012724525B2

(12) United States Patent
Tsai

(10) Patent No.: US 12,724,525 B2
(45) **Date of Patent: *Sep. 1, 2026**

(54) SYSTEM AND METHOD FOR GENERATING AN INTEGRATED MOBILE GRAPHICAL EXPERIENCE USING COMPILED-CONTENT FROM MULTIPLE SOURCES

(71) Applicant: Zumobi, LLC, Austin, TX (US)

(72) Inventor: Wade Tsai, Seattle, WA (US)

(73) Assignee: Zumobi, LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/429,118

(22) Filed: Feb. 9, 2017

(65) Prior Publication Data

US 2018/0225024 A1 Aug. 9, 2018

(51) Int. Cl.

*G06F 3/04817* (2022.01)
*G06F 8/38* (2018.01)

(Continued)

(52) U.S. Cl.

CPC ............ *G06F 3/04817* (2013.01); *G06F 8/38* (2013.01); *G06F 9/451* (2018.02); *G06F 9/453* (2018.02);

(Continued)

(58) Field of Classification Search

CPC .. G06F 3/0481; G06F 3/04817; G06F 3/0483; G06F 3/0484; G06F 9/451;

(Continued)

(56) References Cited

U.S. PATENT DOCUMENTS 6,430,624 B1 * 8/2002 Jamtgaard ............. G06F 16/957 709/246
7,702,636 B1 * 4/2010 Sholtis .................. G06F 16/256 707/999.1

(Continued)

OTHER PUBLICATIONS

Zumobi, Zumobi Bank of America—Special Olympics Pass the Flame Mobile Experience, Nov. 5, 2015, Vimeo, https://vimeo.com/144788236.

*Primary Examiner* — Jessica S Manno
*Assistant Examiner* — Andrew Chung

(57) ABSTRACT

The present disclosure describes systems, methods, and a graphical user interface implementing techniques for optimizing and integrating compiled-content provided from at least one compiled-content source for use by an integrated mobile graphical media experience executed in a mobile device. A crawling module is provided to extract a plurality of compiled-content items, having a plurality of data formats, from the compiled-content source. The crawling module is also configured to reformat at least one compiled-content item of the plurality of compiled-content items based on predetermined optimization requirements. A rendering module configured to generate, using the plurality of compiled-content items, the integrated mobile graphical media experience based on a template for execution on the mobile device. The integrated mobile graphical media experience includes a plurality of display items, and each display item in the plurality of display items corresponds to a respective compiled-content item of the plurality of compiled-content items.

22 Claims, 6 Drawing Sheets

(51) Int. Cl.

| | |
|---|---|
| ***G06F 9/451*** | (2018.01) |
| ***G06F 16/957*** | (2019.01) |
| ***H04L 67/00*** | (2022.01) |
| ***H04L 67/02*** | (2022.01) |
| ***H04L 67/1097*** | (2022.01) |
| ***H04L 67/125*** | (2022.01) |
| *G06F 3/0482* | (2013.01) |
| *H04M 1/72445* | (2021.01) |

(52) U.S. Cl.

CPC ............ *G06F 16/957* (2019.01); *H04L 67/00* (2013.01); *H04L 67/02* (2013.01); *H04L 67/1097* (2013.01); *H04L 67/125* (2013.01); *G06F 3/0482* (2013.01); *H04M 1/72445* (2021.01)

(58) Field of Classification Search

CPC .......... G06F 9/453; G06F 16/957; G06F 8/38; G06F 3/0482; H04L 67/00; H04L 67/02; H04L 67/1097; H04L 67/125; H04M 1/72561

See application file for complete search history.

(56) References Cited

U.S. PATENT DOCUMENTS

| | | | | | |
|---|---|---|---|---|---|
| 7,870,478 | B1 * | 1/2011 | Chiaro, Jr. | G06F 40/143 | 715/223 |
| 8,429,559 | B2 * | 4/2013 | Gaucas | G06Q 30/02 | 715/789 |
| 8,656,431 | B2 | 2/2014 | Cavicchia | | |
| 9,015,578 | B2 * | 4/2015 | Cooper | G06F 40/186 | 715/243 |
| 9,690,577 | B1 * | 6/2017 | Crew | G06F 9/541 | |
| 9,781,457 | B1 * | 10/2017 | James | G06F 16/44 | |
| 9,953,009 | B1 * | 4/2018 | Behar | G06F 40/106 | |
| 10,410,257 | B1 * | 9/2019 | Choi | G06Q 30/0276 | |
| 2002/0036654 | A1 * | 3/2002 | Evans | G06Q 30/02 | 715/744 |
| 2002/0198962 | A1 * | 12/2002 | Horn | G06F 16/955 | 707/E17.112 |
| 2003/0131312 | A1 * | 7/2003 | Dang | G06F 16/40 | 715/213 |
| 2003/0179301 | A1 * | 9/2003 | Feldis | H04N 1/00127 | 348/231.3 |
| 2004/0078759 | A1 * | 4/2004 | Ohashi | G06F 40/186 | 715/248 |
| 2004/0205531 | A1 * | 10/2004 | Innes | G06Q 10/10 | 715/224 |
| 2005/0055635 | A1 * | 3/2005 | Bargeron | G06F 40/103 | 715/251 |
| 2006/0106662 | A1 * | 5/2006 | Palop | G06F 40/10 | 705/14.4 |
| 2006/0294074 | A1 * | 12/2006 | Chang | G06F 16/951 | |
| 2007/0174291 | A1 * | 7/2007 | Cooper | G06F 9/451 | |
| 2008/0189603 | A1 * | 8/2008 | Kikuchi | G06F 40/186 | 715/243 |
| 2008/0208796 | A1 * | 8/2008 | Messer | G06Q 30/02 | |
| 2008/0244373 | A1 * | 10/2008 | Morris | G11B 27/034 | 707/999.103 |
| 2008/0288338 | A1 * | 11/2008 | Wiseman | G06Q 30/02 | 705/14.69 |
| 2009/0271762 | A1 * | 10/2009 | Taylor | G06Q 10/10 | 717/107 |
| 2011/0010661 | A1 * | 1/2011 | Wade | G06F 16/951 | 715/803 |
| 2011/0055687 | A1 * | 3/2011 | Bhandar | G06F 17/00 | 715/235 |
| 2011/0138331 | A1 * | 6/2011 | Pugsley | G06F 16/68 | 715/835 |
| 2011/0225309 | A1 * | 9/2011 | Riley | H04L 47/10 | 709/228 |
| 2011/0283185 | A1 * | 11/2011 | Obasanjo | G06F 40/186 | 715/243 |
| 2012/0159314 | A1 * | 6/2012 | Schrier | G06F 16/9577 | 715/252 |
| 2012/0278704 | A1 | 11/2012 | Ying et al. | | |
| 2013/0031456 | A1 * | 1/2013 | Fu | G06F 16/335 | 715/230 |
| 2013/0060855 | A1 * | 3/2013 | Xia | H04L 67/02 | 709/204 |
| 2013/0132366 | A1 * | 5/2013 | Pieper | G06F 16/9535 | 707/710 |
| 2013/0166390 | A1 * | 6/2013 | Blow | H04L 67/06 | 705/14.66 |
| 2013/0166391 | A1 * | 6/2013 | Blow | H04L 67/06 | 705/14.66 |
| 2013/0204664 | A1 * | 8/2013 | Romagnolo | G06Q 30/0203 | 705/7.32 |
| 2013/0290289 | A1 * | 10/2013 | Yu | G06F 16/9535 | 707/706 |
| 2013/0290837 | A1 * | 10/2013 | Hudetz | G06F 40/106 | 715/255 |
| 2013/0290859 | A1 * | 10/2013 | Venkitaraman | H04N 21/254 | 715/744 |
| 2014/0006934 | A1 * | 1/2014 | Wang | G06F 16/9577 | 715/235 |
| 2014/0012923 | A1 * | 1/2014 | Caldwell | G06Q 10/107 | 709/206 |
| 2014/0052838 | A1 * | 2/2014 | Giacomoni | H04L 41/0893 | 709/223 |
| 2014/0059247 | A1 | 2/2014 | Vachharajani et al. | | |
| 2014/0120513 | A1 * | 5/2014 | Jenkins | G06F 17/27 | 434/362 |
| 2014/0298243 | A1 * | 10/2014 | Le | G06F 16/248 | 715/780 |
| 2014/0304247 | A1 * | 10/2014 | Fastlicht | G06F 16/40 | 707/706 |
| 2014/0325374 | A1 * | 10/2014 | Dabrowski | G06F 9/451 | 715/744 |
| 2015/0073922 | A1 * | 3/2015 | Epperson | G06Q 30/0277 | 705/14.73 |
| 2015/0088621 | A1 * | 3/2015 | Shinohara | H04L 67/10 | 705/14.4 |
| 2015/0106687 | A1 * | 4/2015 | McLaughlin | G06Q 30/02 | 715/234 |
| 2015/0248423 | A1 * | 9/2015 | Christolini | G06F 16/9577 | 715/202 |
| 2015/0264105 | A1 * | 9/2015 | V. | H04L 67/02 | 709/201 |
| 2015/0363488 | A1 * | 12/2015 | Hoyne | G06F 16/958 | 707/771 |
| 2016/0092406 | A1 * | 3/2016 | Farouki | G06K 9/00463 | 715/249 |
| 2016/0162532 | A1 | 6/2016 | Zhang et al. | | |
| 2016/0179763 | A1 * | 6/2016 | Barraclough | H04L 67/306 | 715/202 |
| 2016/0327296 | A1 * | 11/2016 | Leising | H04L 67/02 | |

* cited by examiner

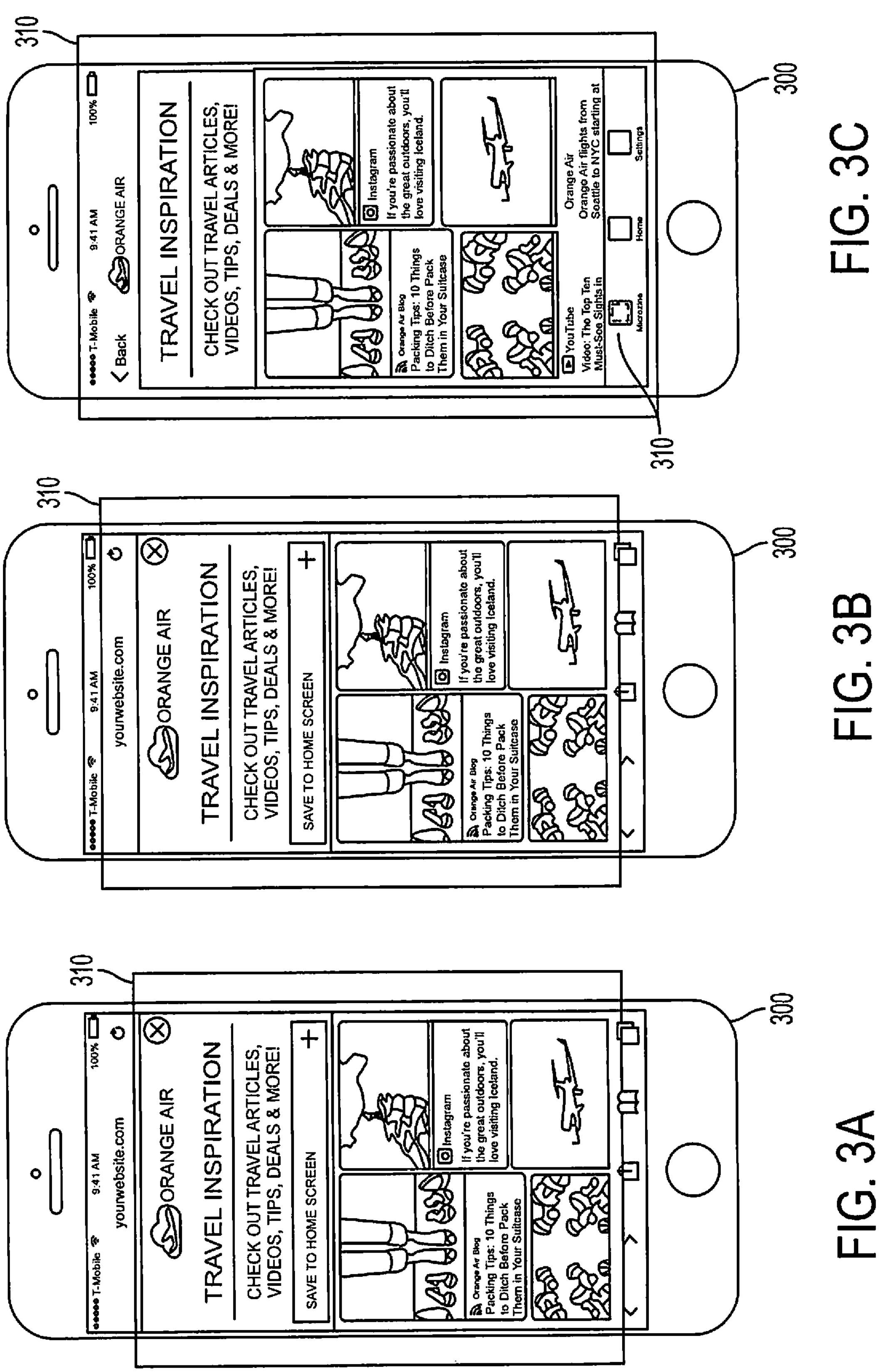
310
300
ORANGE AIR
yourwebsite.com
TRAVEL INSPIRATION
CHECK OUT TRAVEL ARTICLES, VIDEOS, TIPS, DEALS & MORE!
SAVE TO HOME SCREEN
Instagram
If you're passionate about the great outdoors, you'll love visiting Iceland.
Orange Air Blog
Packing Tips: 10 Things to Ditch Before Pack Them in Your Suitcase
Back
YouTube
Video: The Top Ten Must-See Sights in
Orange Air
Orange Air flights from Seattle to NYC starting at
Home
Settings
FIG. 3A
FIG. 3B
FIG. 3C

SYSTEM AND METHOD FOR GENERATING AN INTEGRATED MOBILE GRAPHICAL EXPERIENCE USING COMPILED-CONTENT FROM MULTIPLE SOURCES

TECHNICAL FIELD

The present application generally relates to integration and optimization of compiled-content from multiple sources for generating an integrated mobile graphical media experience for execution on a mobile device.

BACKGROUND

Companies possess and/or generate a great amount of content from multiple, and in some cases disparate, sources. Such content may include video clips, blogs, social media posts, long form articles, promotions, etc. At the same time, use of mobile devices has become widespread. Distributing content to mobile users is typically done using a platform that is specific to the type of content. For example, a social media post may typically be consumed by a user using a social media app, and a web article may be consumed by a user using a web browser. Thus, content distribution systems and mobile devices lack the capability and functionality to compile and integrate the content from the different sources for distribution to mobile devices and for presentation on an integrated mobile graphical media experience.

Furthermore, the content being produced is typically not optimized for mobile distribution. Oftentimes, a particular content may include high quality images, or may be a high quality video, which is not suitable for consumption at a mobile device, given the limitations of the mobile device with respect to bandwidth, graphical user interface (GUI) space, battery life, storage capacity, etc. Additionally, the format of the content from the different sources may be different for each source. Therefore, content distribution systems and mobile devices also lack capability and functionality to optimize content from multiple sources for distribution to and consumption by a mobile device.

Moreover, new content is constantly being generated, but typical distribution systems may not possess the functionality to dynamically update the mobile graphical media experience with the newly generated content. Even more, typical systems lack the functionality to identify content that may be relevant to a particular user and to update the mobile graphical media experience with only the relevant content.

In light of the above problems and limitations of content distribution systems and mobile devices, various aspects of the present disclosure are directed to systems and techniques for improving distribution systems to optimize compiled-content from different sources for distribution to and consumption by a mobile device, and for improving mobile devices to provide for an improved GUI for presentation and interaction with the optimized compiled-content from the different sources on an integrated mobile graphical media experience.

Thus, it should be appreciated that the techniques and systems disclosed herein provide a technical solution to technical problems existing in the conventional industry practice of compiled-content distribution and presentation systems. Furthermore, the techniques and systems disclosed herein embody a distinct process that provides an improvement to existing computer systems by providing the computer systems with new capabilities and functionality for integrating and optimizing compiled-content from different sources for distribution to and consumption by a mobile device, and for improving a GUI of a mobile device for presentation of the optimized compiled-content from the different sources on an integrated mobile graphical media experience, which prior art computer systems do not possess.

BRIEF SUMMARY

The present disclosure describes techniques and systems for optimizing systems which integrate and distribute compiled-content from multiple content sources for distribution to and consumption by a mobile device, and for improving mobile devices to provide for an improved a GUI of a mobile device for presentation of the optimized compiled-content from the different sources on an integrated mobile graphical media experience. An integrated mobile graphical media experience herein may refer to the aggregation of the integrated and optimized compiled-content from the multiple compiled-content sources.

In accordance with one aspect, a system for optimizing and integrating compiled-content provided from at least one compiled-content source to generate an integrated mobile graphical media experience executed in a mobile device is disclosed. The system may include a crawling module configured to extract a plurality of compiled-content items from the at least one compiled-content source. In some aspects, the plurality of compiled-content items comprises items having a plurality of data formats. In aspects, the crawling module may also be configured to reformat at least one compiled-content item of the plurality of compiled-content items based on predetermined optimization requirements. In some aspects, the optimization requirements may be requirements related to the bandwidth limits and storage limits of the mobile device or of the system itself. The system may also include a parsing module for parsing the plurality of compiled-content items to facilitate keyword analysis of the plurality of compiled-content items. In some aspects, the keyword analysis of the compiled-content is used to identify additional compiled-content from the compiled-content sources related to the parsed compiled-content. In additional aspects, the keyword analysis identifies keyword tags that are additional to any tag originally included in the plurality of compiled-content items, and a context of the identified keyword tags is related to the integrated mobile graphical media experience. The system may further include a rendering module configured to generate, using the plurality of compiled-content items, the integrated mobile graphical media experience based on a template for execution on the mobile device. In some aspects, the integrated mobile graphical media experience includes a plurality of display items, and each display item in the plurality of display items corresponds to a respective compiled-content item of the plurality of compiled-content items. In further aspects, the template defines a layout of the plurality of display items on the integrated mobile graphical media experience based on the data formats of the respective compiled-content items corresponding to each display item in the plurality of display items.

In accordance with another aspect, a method of generating an integrated mobile graphical media experience for execution in a mobile device is disclosed. The method includes receiving compiled-content from at least one compiled-content source. In some aspects, the compiled-content is associated with a topic of the integrated mobile graphical media experience. The method also includes extracting a plurality of compiled-content items from the compiled-content. In some aspects, the plurality of compiled-content items comprises items having a plurality of data formats. The method further includes determining optimization requirements for the integrated mobile graphical media experience, and reformatting at least one compiled-content item of the plurality of compiled-content items based on the optimization requirements. The method may also include generating, using the plurality of compiled-content items, the integrated mobile graphical media experience based on a template for execution on the mobile device. In some aspects, generating the integrated mobile graphical media experience includes generating a plurality of display items, and each display item in the plurality of display items may correspond to a respective compiled-content item of the plurality of compiled-content items. In further aspects, the template may define a layout of the plurality of display items on the integrated mobile graphical media experience based on the data formats of the respective compiled-content items corresponding to each display item in the plurality of display items.

In accordance with yet another aspect, a graphical user interface (GUI) optimized for executing an integrated mobile graphical media experience of compiled-content received from at least one compiled-content source on a user of a processor-based mobile device is disclosed. The GUI includes a plurality of selectable icons, each selectable icon of the plurality of selectable icons corresponding to a respective display item containing at least a portion of the compiled-content received from the at least one compiled-content source. In some aspects, the portions of the compiled-content in the respective display items have a plurality of data formats. In other aspects, each respective display item is associated with a topic of the integrated mobile graphical media experience. In further aspects, the portion of the compiled-content in the respective display item is reformatted from an original format received from the at least one compiled-content source based on optimization requirements. In yet further aspects, a layout of the plurality of selectable icons on the integrated mobile graphical media experience is defined by a template based on the data formats of the respective display items corresponding to each selectable icon in the plurality of selectable icons. The GUI also includes a portion for displaying, upon selection of at least one selectable icon, the contents of the respective article corresponding to the selected at least one selectable icon. In some aspects, the contents of the respective article are optimized for display in the GUI of the processor-based mobile device.

In some aspects, the at least one compiled-content source may include a plurality of compiled-content sources providing compiled-content having different formats. In these aspects, the compiled-content from at least one compiled-content source of the plurality of compiled-content sources may be reformatted for rendering onto the integrated mobile graphical media experience. In other aspects, the compiled-content from at least one other compiled-content source of the plurality of compiled-content sources may not be reformatted and may be rendered onto the integrated mobile graphical media experience in the original format.

The foregoing has outlined rather broadly the features and technical advantages of the present invention in order that the detailed description that follows may be better understood. Additional features and advantages will be described hereinafter which form the subject of the claims. It should be appreciated by those skilled in the art that the conception and specific embodiment disclosed may be readily utilized as a basis for modifying or designing other structures for carrying out the same purposes of the present application. It should also be realized by those skilled in the art that such equivalent constructions do not depart from the spirit and scope of the application as set forth in the appended claims. The novel features which are believed to be characteristic of embodiments described herein, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present embodiments.

BRIEF DESCRIPTION OF THE DRAWINGS

For a more complete understanding, reference is now made to the following descriptions taken in conjunction with the accompanying drawings, in which:

FIGS. 3A-3C illustrate a graphical media experience rendered for different mobile interfaces;

DETAILED DESCRIPTION

Figure 1:
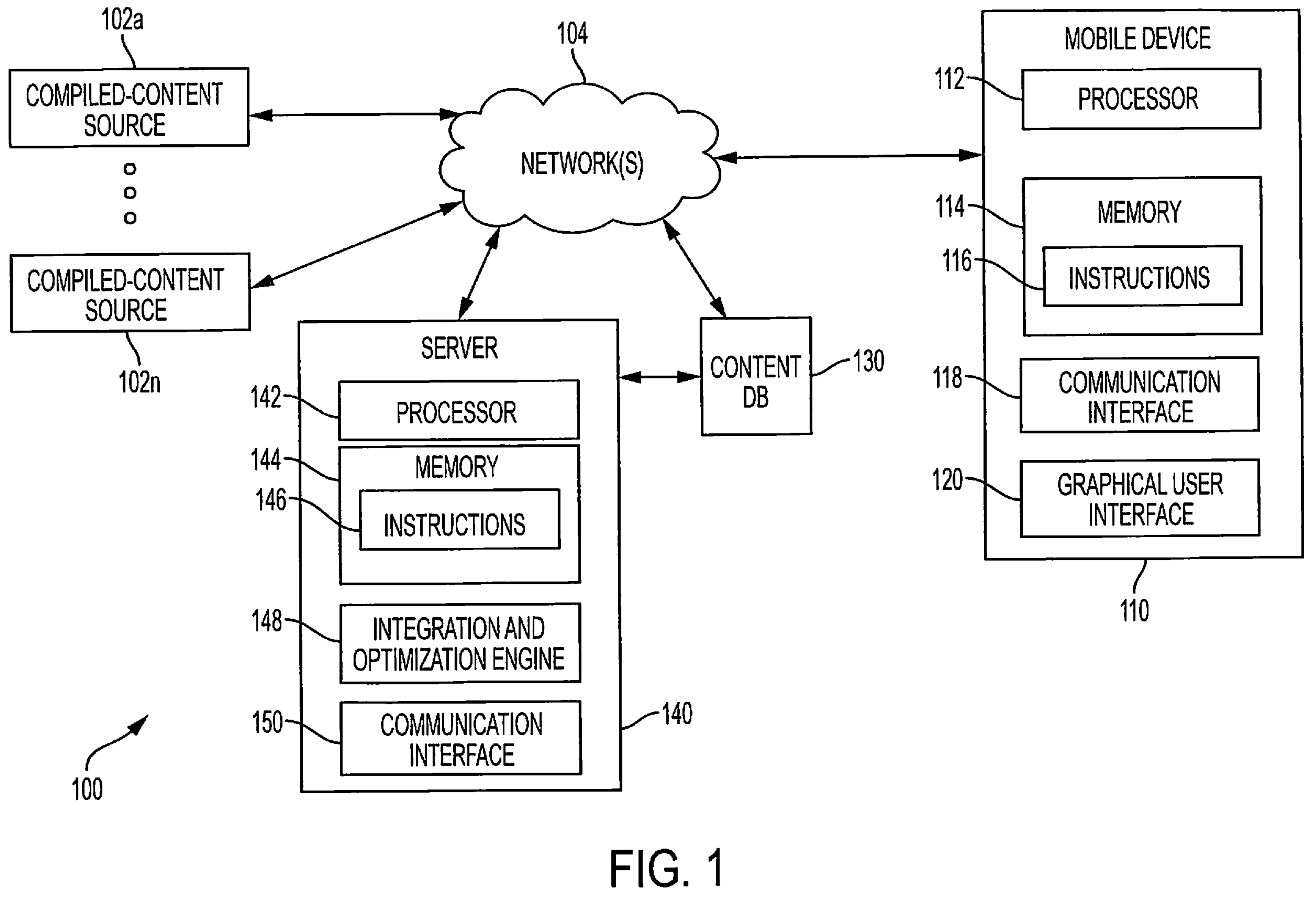
FIG. 1 is a block diagram of a system configured for optimizing and integrating compiled-content provided from at least one compiled-content source for use by an integrated mobile graphical media experience executed in a mobile device.

Referring to FIG. 1, a block diagram of an exemplary system configured with capabilities and functionality for optimizing compiled-content from multiple sources for distribution to and consumption by a mobile device, and for improving a GUI of a mobile device for presentation of the optimized compiled-content from the different sources on an integrated mobile graphical media experience is shown as system 100. As shown in FIG. 1, system 100 includes mobile device 110, server 140, content database (DB) 130, compiled-content sources 102*a-n*, and network(s) 104. System 100 may facilitate distribution of compiled-content, received from compiled-content sources 102*a-n*, by optimizing a GUI of mobile device 110 for presentation of the compiled-content, as described in detail below.

It is noted that compiled-content may refer to content owned by a particular entity, for example content produced or acquired by a particular entity and may refer to a particular product or article. Compiled-content may additionally refer to content curated by a particular entity. For example, curated-content may refer to content sourced from various and/or different sources and may be related to a particular brand or product. Compiled-content may additionally refer to content published by a particular entity. For example, publisher-content may refer to content published by a particular entity and may refer to a particular product or article. Compiled-content may refer to content having different data formats, e.g., news articles, Rich Site Summary (RSS) feeds content, video clips, blogs, social media posts, long form articles, promotional advertisements, etc. The compiled-content may be particularly related to a product or article (e.g., a consumer product, a promotional campaign, a product brand, a consumer activity, etc.). Compiled-content sources may refer to any system or platform that generates, stores, or otherwise makes content available (e.g., social media streams, blogs, video sources, news sources, websites, media servers, RSS feeds, etc.).

Mobile device 110 may be a smartphone, a tablet computing device, a computer system of a vehicle, a smart television, a personal digital assistant (PDA), a smart watch, a global positioning system (GPS) device, etc. Mobile device 110 may include processor 112, memory 114, communication interface 118, and GUI 120. Memory 114 may include read only memory (ROM) devices, random access memory (RAM) devices, one or more hard disk drives (HDDs), flash memory devices, solid state drives (SSDs), other devices configured to store data in a persistent or non-persistent state, or a combination of different memory devices. Memory 114 may store instructions 116 that, when executed by processor 112, cause processor 112 to perform operations described in connection with mobile device 110 with reference to FIGS. 1-5. As described in more detail below, GUI 120 of mobile device 110 may be optimized for presentation of compiled-content from the different sources on an integrated mobile graphical media experience.

Communication interface 118 may be configured to communicatively couple mobile device 110 to one or more networks, such as network 104, as shown in FIG. 1. Communication interface 118 may be configured to communicatively couple mobile device 110 to network 104 via a wired or wireless connection established according to one or more communication protocols or standards (e.g., an Ethernet protocol, a transmission control protocol/internet protocol (TCP/IP), an Institute of Electrical and Electronics Engineers (IEEE) 802.11 protocol, and an IEEE 802.16 protocol, a 3rd Generation (3G) protocol, a 4th Generation (4G)/long term evolution (LTE) protocol, etc.).

Network 104 may be a wired network, a wireless network, or may include a combination of wired and wireless networks. For example, network 104 may include a local area network (LAN), a wide area network (WAN), a wireless WAN, a wireless LAN (WLAN), a metropolitan area network (MAN), a wireless MAN network, a cellular data network, a cellular voice network, the internet, other types of public and private networks, or a combination thereof. Additionally, network 104 may include multiple networks operated by different entities. For example, network 104 may include a first network (e.g., a virtual private network (VPN)) operated by a first operator, and a second network (e.g., a LAN, WAN, WLAN, wireless WAN, a cellular data network, etc.) operated by a second operator. To illustrate, the first network may be a VPN network provided by an operator of server 140, and the second network may be a cellular data network provided by a cellular network service provider. The first network may provide a secure connection from compiled-content sources 102*a-n* to server 140 for securely providing content to server 140, and the second network may provide a connection between mobile device 110 and server 140 for distribution of the content to mobile device 110.

As shown in FIG. 1, server 140 includes processor 142, memory 144, integration and optimization engine 148, and communication interface 150. The memory 144 may include ROM devices, RAM devices, one or more HDDs, flash memory devices, SSDs, other devices configured to store data in a persistent or non-persistent state, or a combination of different memory devices. Memory 144 may store instructions 146 that, when executed by processor 142, cause processor 142 to perform operations described in connection with server 140 with reference to FIGS. 1-5. Communication interface 150 may be configured to communicatively couple server 140 to one or more networks, such as network 104, as shown in FIG. 1. Communication interface 150 may be configured to communicatively couple server 140 to network 104 via a wired or wireless connection established according to one or more communication protocols or standards (e.g., an Ethernet protocol, a TCP/IP protocol, IEEE 802.11 protocol, and an IEEE 802.16 protocol, a 3G protocol, a 4G/LTE protocol, etc.). As described in more detail below, integration and optimization engine 148 may be configured to integrate and optimize compiled-content from different sources to generate an integrated mobile graphical media experience for distribution to and consumption by a mobile device. In an aspect, integration and optimization engine 148 is stored at memory 144 as instructions 146.

Content DB 130 may store content related to an integrated mobile graphical media experience for distribution to and consumption by a mobile device generated from the compiled-content provided to integration and optimization engine 148. In an aspect, content DB 130 may be part of server 140. In other aspects, content DB 130 may be stored at a device separate from server 140, such as a network attached storage (NAS) device communicatively coupled to server 140, or may be stored at a storage area network (SAN) communicatively coupled to server 140. Additionally or alternatively, content DB 130 may be stored at a removable storage device (e.g., an external HDD, a flash drive, etc.) coupled to server 140. Furthermore, content DB 130 may be stored across multiple storage devices (e.g., in a redundant array of independent disks (RAID) configuration or across storage devices located at geographically disparate locations) integrated with or otherwise accessible to server 140. Content DB 130 may store the integrated mobile graphical media experiences generated for mobile device 110. It is noted that, although content DB 130 is described as a database, in some aspects, content DB 130 may be a content bundle, which may refer to targetable groups of content that are assembled based on specific criteria, or assembled by selecting individual content.

In an aspect, server 140 may be a single device operable to perform the operations of server 140, as described with reference to FIGS. 1-5. In other aspects, server 140 may be distributed over multiple devices, whose aggregate functionality may be configured to perform the operations of server 140 in accordance with the present disclosure. Similarly, in an aspect, integration and optimization engine 148 of server 140 may be a single component of server 140 (e.g., a single application, server module, etc.) or may be distributed over multiple devices. In such aspects, the functionality of integration and optimization engine 148 may be aggregated from the functionality of multiple modules residing in a single, or in multiple devices. Those of skill in the art would recognize that although FIG. 1 illustrates the components of server 140 as single blocks, the implementation of the components and of server 140 is not limited to a single component and, as described above, may be distributed over several components.

Figure 2:
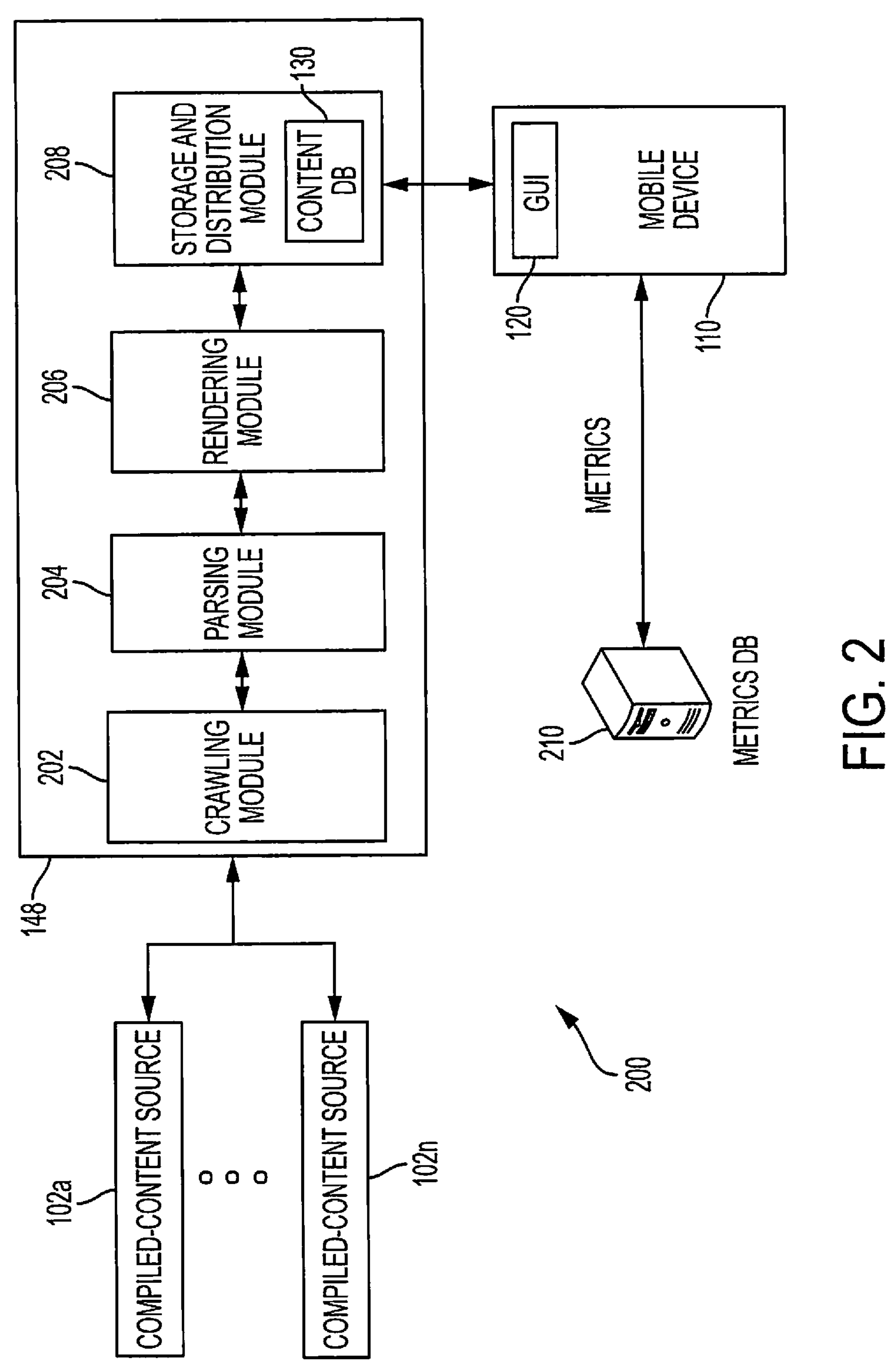
FIG. 2 is a is a block diagram of a system configured for optimizing and integrating compiled-content provided from at least one compiled-content source for use by an integrated mobile graphical media experience executed in a mobile device.

With reference to FIG. 2, a block diagram illustrating integration and optimization engine 148 is shown. As shown in FIG. 2, integration and optimization engine 148 includes crawling module 202, parsing module 204, rendering module 206, and storage and distribution module 208. It is noted that while the different modules are illustrated as different components, such example is provided by way of illustration, rather than by way of limitation, and the different modules may be part of single module and/or may represent functionality of such a module. Furthermore, the functionality of particular modules may be combined into a single module configured to perform the functions of the particular modules. For example, in some aspects, crawling module 202 and rendering module 206 may be combined into a single module operable to perform the operations of both crawling module 202 and rendering module 206.

During operation, server 140 may receive a plurality of compiled-content data items via network 104 from a plurality of sources. For example, compiled-content from compiled-content sources 102*a-n* may be provided to integration and optimization engine 148 of server 140. Although FIGS. 1 and 2 show two compiled-content sources, it is noted that any number of sources may be used, and thus, the techniques disclosed herein apply to systems with more than two compiled-content sources. Compiled-content sources 102*a-n* may be any of many types of compiled-content sources. As noted above, companies generate and/or acquire a great amount of compiled-content from across many, and varied, sources. In some aspects, compiled-content sources 102*a-n* may be social media streams, blogs, video sources, news sources, websites, media servers, RSS feeds, etc. Compiled-content sources 102*a-n* may all be a source of the compiled-content having the same data format, or may each be a source of compiled-content having different data formats. For example, compiled-content source 102*a* may be a video source, while compiled-content source 102*n* may be a social media stream source. A person of ordinary skill in the art would understand that any combination of sources may be applicable.

In some aspects, the compiled-content source may be validated to ensure that the content provided to integration and optimization engine 148 is content that is actually owned by the entity for which the compiled-content is being curated and distributed. For example, a social media account may be validated to ensure that the account belongs to the entity whose compiled-content is to be curated and distributed. In aspects, the compiled-content may include content generated by the entity, and/or content generated by a party other than the entity. In some aspects, the compiled-content source may not be the author of the compiled-content but may be an authorized distribution of the compiled-content on behalf of the entity. For example, a third party may generate a video clip of a review of a product manufactured by the entity. The entity may authorize distribution of the video review of the product by providing the video review or information representative of the video review to the integration and optimization engine 148.

The compiled-content provided by compiled-content sources 102*a-n* may be originally formatted for consumption via a particular platform related to the compiled-content source. For example, a news article from a news website may be formatted as an HTML document. In another example, an RSS weblog may be formatted as an RSS feed for consumption by an RSS reader. In the examples above, it should be appreciated that the format of the content delivered is different for each of the two sources. In some cases, the compiled-content source may be a standard structured feed (e.g., RSS, Atom, etc.) or may be a custom structured feed (e.g., JavaScript Object Notation (JSON), eXtensible Markup Language (XML), non-standard Atom, a proprietary formatted feed, etc.). In some aspects, the compiled-content sources may be unstructured data sources.

Crawling module 202 may be configured to analyze the compiled-content received from compiled-content sources 102*a-n* and to extract particular content from the compiled-content based on optimization rules and requirements. The optimization rules and requirements may be specific to facilitate optimization of the compiled-content for presentation on a mobile graphical media experience, and may include bandwidth, image resolution, storage, or other requirements for mobile optimization. In some aspects, the optimization rules and requirements may be expressed as an optimization threshold value under which the mobile graphical media experience may be said to be optimized for mobile device 110. For example, a mobile graphical media experience presented on GUI 120 of mobile device 110 may be preferred to have a size less than 7 Mbytes. In some aspects, the mobile graphical media experience presented on GUI 120 of mobile device 110 may be preferred to have a size less than 3 Mbytes for an optimal experience. In this example, an compiled-content RSS feed may be analyzed to obtain the raw content from the feed, which may include text and images. It is noted that in some aspects the raw content is extracted directly from the RSS feed and in some aspects the raw content is obtained from a link in the RSS feed. Crawling module 202 may determine that using the raw images in the mobile graphical media experience would result in a mobile graphical media experience with a size greater than 7 Mbytes. In such an example, the resolution and/or size of the images may be reduced to meet the 7 Mbytes bandwidth and/or storage requirements. Alternatively, crawling module 202 may determine to only use the first image in the RSS feed, and to discard the remaining images in the RSS feed, thus reducing the overall size of the mobile graphical media experience.

In other aspects, optimizing the compiled-content may include optimizing a video clip resolution and/or a video buffer data for presentation of the video clip as part of the mobile graphical media experience. In these aspects, the video clip may be used to generate a thumbnail artwork featuring the optimized video clip. In some aspects, the optimization of the compiled-content may comprise optimizing a single compiled-content data item of the mobile graphical media experience, or may comprise a global optimization of the entire mobile graphical media experience based on a plurality of compiled-content data items. For example, a space, size, resolution limit may be used to limit the number of compiled-content data items in the mobile graphical media experience.

In some aspects, the optimization rules and requirements (e.g., bandwidth, resolution, storage, etc.) may be rules and requirements with respect to mobile device 110 or may be rules and requirements with respect to server 140. For example, the size of a mobile graphical media experience may be limited by the storage capacity of content DB 130, in which the mobile graphical media experience may be eventually stored. It is noted that in aspects where content DB 130 refers to a content bundle, the size of the mobile graphical media experience may not be limited by storage capacity. In these aspects, the content bundle may be of any arbitrary size. Additionally, a plurality of mobile graphical media experiences may be generated and stored in content DB 130. The plurality of mobile graphical media experiences may correspond to different topics associated with the entity. For example, one mobile graphical media experience may be related to a particular product manufactured and/or sold by the entity, and another mobile graphical media experience may be related to an activity in which customers, or target customers, of the entity may engage. The plurality of mobile graphical media experiences may also correspond to different topics associated with different entities.

In aspects, crawling module 202 may be configured to analyze the compiled-content and to extract particular content from the compiled-content based on the type of the compiled-content source. For example, crawling module 202 may determine that a particular compiled-content source is a standard structured feed (e.g., RSS feed, Atom feed, etc.). Based on this determination, crawling module 202 extracts the target content from the feed and optimizes the content for use in a mobile graphical media experience as described above. In another case, crawling module 202 may determine that a particular compiled-content source is a feed that is not a well-known or standard structured feed, but rather a custom structured feed (e.g., JSON, XML, etc.).

In an aspect, crawling module 202 may be configured to implement feed-blending. Using feed-blending, content provided by compiled-content sources 102*a-n* may be blended based on customizable criteria. The customizable criteria may be applicable to a particular mobile graphical media experience of an entity, or may be applicable to all mobile graphical media experiences for the entity. The criteria may be further based on templates that are used to render the integrated and customized compiled-content to the mobile graphical media experience, and which are described in greater detail below. Customizable criteria may be used by integration and optimization engine 148 to customize the look and feel of the mobile graphical media experience. For example, customizable criteria may specify that, for a particular mobile graphical media experience, every fourth article should be a video clip, or that every page of the mobile graphical media experience should have a social media post. Customizable criteria may also benefit system performance. For example, customizable criteria may specify that popular articles be included on a mobile graphical media experience in a place of prominence. Doing so may ensure that customers of the entity have access to compiled-content that has been positively reviewed by other users. It is further noted that, in some aspects, feed blending may be performed by rendering module 206. This could be in addition to or instead of the feed blending performed by crawling module 202.

Parsing module 204 may parse the optimized compiled-content to facilitate keyword and taxonomy analysis of the compiled-content. The keyword and taxonomy analysis may analyze the compiled-content to determine key words and the relevant percentage of each key word as used in the compiled-content. The analysis may also include determining an identification category of the analyzed compiled-content. Based on the analysis, additional compiled-content related to the analyzed compiled-content may be identified to be used in the mobile graphical media experience. For example, a social media post reviewing a particular product may be parsed and a keyword and taxonomy analysis may be performed on the parsed article. The analysis may render relevant keywords and taxonomy of the article, as well as an identification category of the article, which may be used to identify other compiled-content related to the particular product (e.g., news articles, promotional emails, video clips, etc.). The related compiled-content may then be also included in the mobile graphical media experience.

In some aspects, the keyword and taxonomy analysis of the parsed compiled-content may be performed by a third party system external to system 100. The third party system may be an artificial intelligence (AI) platform that is configured to perform the keyword and taxonomy analysis of the parsed compiled-content. In aspects, the compiled-content may include tags (e.g., keyword meta tags) that a typical system may use to identify content related to the compiled-content. However, under this traditional tag approach, the keyword tags fall within the original context of the compiled-content under which the compiled-content existed in the original compiled-content source. Therefore, any related content identified from the tags would also be tied to the original context of the compiled-content. In aspects of the present disclose, the AI platform may analyze the parsed compiled-content and may generate an compiled-content keyword and taxonomy map that is supplementary to and/or independent from any existing tags of the compiled-content, and that instead may fall within the context of the mobile graphical media experience. The compiled-content keyword and taxonomy map may be used to identify additional compiled-content related to the parsed compiled-content. Under this new AI approach, the additional compiled-content is not tied to the original context of the parsed compiled-content but instead may fall within the context of the mobile graphical media experience.

Rendering module 206 may inject a template using the optimized compiled-content from crawling module 202 and parsing module 204 to render the compiled-content into a format determined by the template. In some aspects, the framework of the entire mobile graphical media experience may be determined by a template, and rendering module 206 may render the mobile graphical media experience by populating the template with the integrated and optimized compiled-content. In aspects, the mobile graphical media experience comprises individual articles which are associated with the compiled-content provided by compiled-content sources 102*a-n*. In these aspects, the individual articles are also rendered by rendering module 206 in a format determined by a predetermined template.

It is noted that by providing predetermined templates that rendering module 206 may use to render the mobile graphical media experience and the individual articles, server 140 is provided with functionality to control the look and behavior of the mobile graphical media experience independent of the compiled-content type and/or source platform. Additionally, a template may be reused for any number of mobile graphical media experiences and/or individual articles, which provides server 140 with scalability and reusability technology for each entity's mobile graphical media experience, and even across different entities.

With reference to FIGS. 3A-3C, the rendered output of rendering module 206 may be a mobile graphical media experience that can be tailored to different mobile interfaces. The mobile graphical media experience may be rendered to be experienced as part of an advertisement. For example, as illustrated in FIG. 3A, the mobile graphical media experience may be presented to a user as interstitial advertisement 310. In this example, interstitial advertisement 310 may cover the full screen of a mobile device and may offer a high level of engagement with the mobile graphical media experience. The mobile graphical media experience presented as interstitial advertisement 310 may be displayed at a natural transition point in the flow of an application or mobile website (e.g., between articles and/or activities).

In some aspects, the mobile graphical media experience may be rendered to be experienced as mobile web destination, such as website or uniform resource location (URL) link. For example, as illustrated in FIG. 3B, the mobile graphical media experience may be presented to a user as web destination 310. In these aspects, the web destination may be dedicated to the mobile graphical media experience. In some aspects, the web destination may be accessed through a mobile advertisement such as a banner.

In aspects, the mobile graphical media experience may be rendered to be experienced as in-app content. In these aspects, the mobile graphical media experience may be integrated into an application, and may be accessed by some call-to-action link or button within the content of the app. In some aspects, the mobile graphical media experience may be accessed via an option in the application's native menu. For example, as illustrated in FIG. 3C, the mobile graphical media experience may be presented to a user as in-app content 310, which may be accessed via button 320. In some aspects, the mobile graphical media experience may be rendered as in-app content to a particular application using a software development kit (SDK) compatible with the particular application.

In some aspects, the rendered mobile graphical media experience may be stored and/or distributed to mobile device 110 by the storage and distribution module 208, as seen in FIG. 2. As shown in FIG. 2, storage and distribution module 208 may include content DB 130. In an aspect, the rendered mobile graphical media experience is distributed to mobile device 110 from storage and distribution module 208.

In other aspects, storage and distribution module 208 pushes the mobile graphical media experience to an external content delivery system (not shown) for distribution to mobile device 110. In these aspects, by enabling content DB 130 to push the mobile graphical media experience to an external content delivery system, system 100 is provided with the capability to possibly decouple the storage of the mobile graphical media experience from the delivery of the mobile graphical media experience to mobile device 110. A mobile device may, during normal operations, access the mobile graphical media experience from the external content delivery system. If an outage of the external content delivery system occurs, delivery of the mobile graphical media experience to mobile device 110 may continue uninterrupted, as the mobile graphical media experience is available at the content database.

In some aspects, the delivery of the mobile graphical media experience that includes the optimized compiled-content to mobile application includes verification of the compiled-content. Systems, methods, and computer-readable storage media that provide secure delivery of compiled-content to a mobile device, and that provide for validation that the content has not been tampered with or altered prior to distributing the content to a mobile device, are disclosed in related, co-owned U.S. Pat. No. 9,438,690, entitled "SYSTEM AND METHOD FOR INSERTING OWNED MEDIA CONTENT INTO MOBILE APPLICATIONS," filed Dec. 8, 2014, the contents of which are hereby incorporated herein by reference in their entirety.

Metrics DB 210 may gather and store metrics on the performance of compiled-content that is curated and distributed in the mobile graphical media experiences. Such metrics may be used in identifying compiled-content that is successfully consumed by a user of mobile device 110. Whenever a user interacts with a mobile graphical media experience, an interaction event may be generated. The interaction event may be then captured and digested by a poller (not shown), which may normalize the interaction events by removing outliers, generating metrics, and storing those metrics in Metrics DB 210. In some aspects, the poller may read the user interaction events from a message queue and write them to Metrics DB 210. In aspects, there may be separate Extract, Transform, Load (ETL) processes that compute aggregate statistics, transform event data into other forms for faster processing, and write them out into summary tables. In these aspects, Metrics DB 210 generates the summary metrics for the summary tables.

In some aspects, the metrics gathered and stored by Metrics DB 210 may include number of views of a particular article of a mobile graphical media experience, duration and engagement activity with the article, selection of shoppable-content within the article, user rating, etc. The metrics may also include initial engagement statistics (e.g., number of taps/swipes recorded immediately after the user begins interaction with the mobile graphical media experience), call-to-action selections, subsequent user activity (e.g., user selects a second article after ready a first article), and metadata associated with the user if the mobile graphical media experience is a used for optimization purposes. The metadata may allow the system to optimize a campaign based on the source of the user base (e.g., users from the first application showed more interest/engagement than users from a second application).

In aspects, the collected metrics may also be used to analyze the content consumption of an entity's customer on an individual basis. This capability may enable system 100 to determine and deliver the compiled-content that is most relevant to the customer, and to deliver it at the most appropriate time. For example, using collected metrics, system 100 may determine that a customer may be consuming content related to moving. Based on this determination, moving-related content may be prioritized for delivery to the customer. To that end, system 100 may dynamically update a particular mobile graphical media experience based on the collected metrics, to include the newly identified compiled-content.

In some aspects, the mobile graphical media experience may be dynamically updated whenever new content related to the topic associated with the mobile graphical media experience is published on a respective platform. For example, an entity's mobile graphical media experience associated with moving activities may be automatically and dynamically updated when a social media post about a post-moving shopping list is posted to the entity's social media account. In such an example, the entity's mobile graphical media experience associated with moving is updated to include the post-moving shopping list social media post. In contrast, in this example, if a social media post about record highs on the stock market is posted to the entity's social media account, such a social media post would not trigger a dynamic update of the entity's mobile graphical media experience associated with moving.

As noted above, the rendered mobile graphical media experience may be distributed to mobile device 110 for presentation using GUI 120. GUI 120 may be configured to present the mobile graphical media experience using the optimized compiled-content from multiple sources as an integrated mobile graphical media experience. In typical systems, a GUI is not capable of presenting an entity's compiled-content from multiple sources as an integrated experience. Instead, in a typical system, an entity's compiled-content from multiple sources may be accessed by using an individual GUI for each of the multiple sources. Thus, in the typical system, if an entity's social media stream is to be accessed, the appropriate social media platform must be used (e.g., the social media network app or website). If then the entity's video content is to be accessed, the appropriate video content platform must be used (e.g., the social media network app or website). In contrast to the fragmented experience of the typical systems, in the integrated mobile graphical media experience provided by a GUI implemented in accordance with the present disclosure, accessing the different entity's compiled-content does not require accessing each platform individually. The integrated mobile graphical media experience of the present disclosure provides a seamless integration of multiple sources into a single platform using GUI 120.

In some aspects, an compiled-content source platform may be integrated into the mobile graphical media experience such that a particular compiled-content data item may be presented as part of the integrated mobile graphical media experience, but the particular compiled-content data item may be rendered by the compiled-content source platform. For example, a video clip from a video sharing platform may be integrated into a mobile graphical media experience, but the video clip may be played, within the mobile graphical media experience, by a video player of the video sharing platform. In some aspects, the integrated mobile graphical media experience may comprise a mixture of compiled-content data items that are reformatted and rendered by the integrated mobile graphical media experience and compiled-content data items that are rendered by the source platform.

Figure 4A:
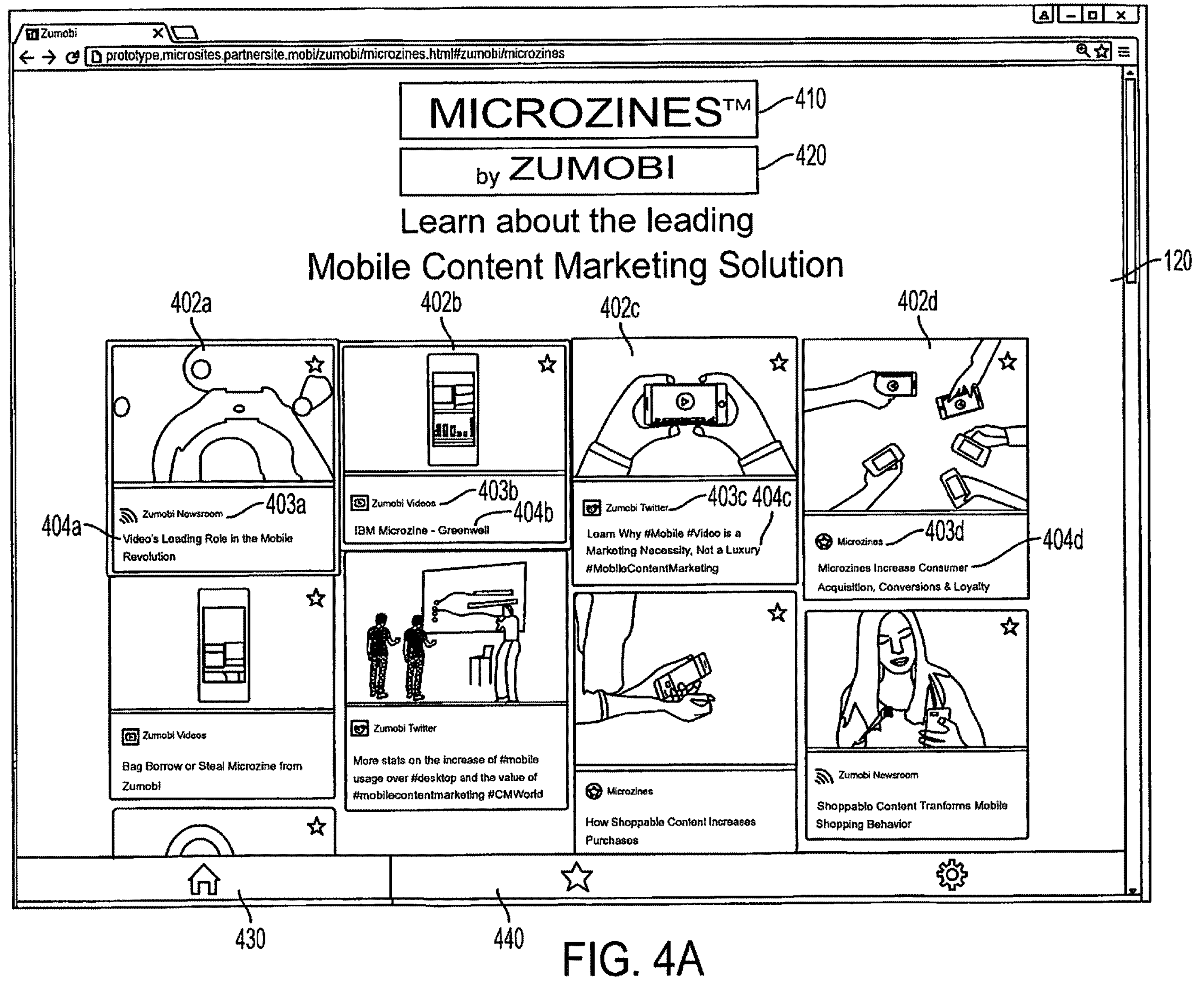
FIGS. 4A and 4B illustrate a graphical user interface configured in accordance with the present disclosure and optimized for presenting an integrated mobile graphical media experience of compiled-content received from at least one compiled-content source to a user of a processor-based mobile device.

FIG. 4A shows an example of GUI 120 and illustrates an integrated mobile graphical media experience in accordance with the present disclosure. As shown in FIG. 4A, the illustrated singular mobile graphical experience is associated with topic 410, "Microzines™" and belongs to entity 420, "Zumobi." As further shown, GUI 120 includes article icons 402*a-d*. Each article icon 402*a-d* is associated with a particular portion of entity's 420 compiled-content. Additionally, each article icon 402*a-d* is related to content from a respective source. For example, article icon 402*b* is associated with video feed 403*b* and represents article 404*b*, "IBM Microzine—Greenwall," which is a portion of entity's 420 compiled-content related to topic 410. Additionally, article icon 402*d* is associated with a web article feed 403*b*, and represents article 404*d*, "Microzines Increase Consumer Acquisition, Conversions & Loyalty," which is a portion of entity's 420 compiled-content related to topic 410. As shown in FIG. 4A, each respective article originates from a different source 403.

It should be appreciated that although the GUI 120 is illustrated with four article icons across, GUI 120 is adaptive based on the size and orientation of GUI 120, or the window in which GUI 120 is displayed. For example, the window in which GUI 120 is displayed may be reduced in size. In this case, GUI 120 may adapt to display a lesser number of article icons to match the new window size. In another example, GUI 120 may be zoomed in, in which case GUI 120 may adapt to organize the article icons on GUI 120 such that the entire article icons may be visible in GUI 120. In yet another example, GUI 120 may adapt the layout of the article icons based on whether landscape orientation or portrait orientation is used.

Figure 4B:
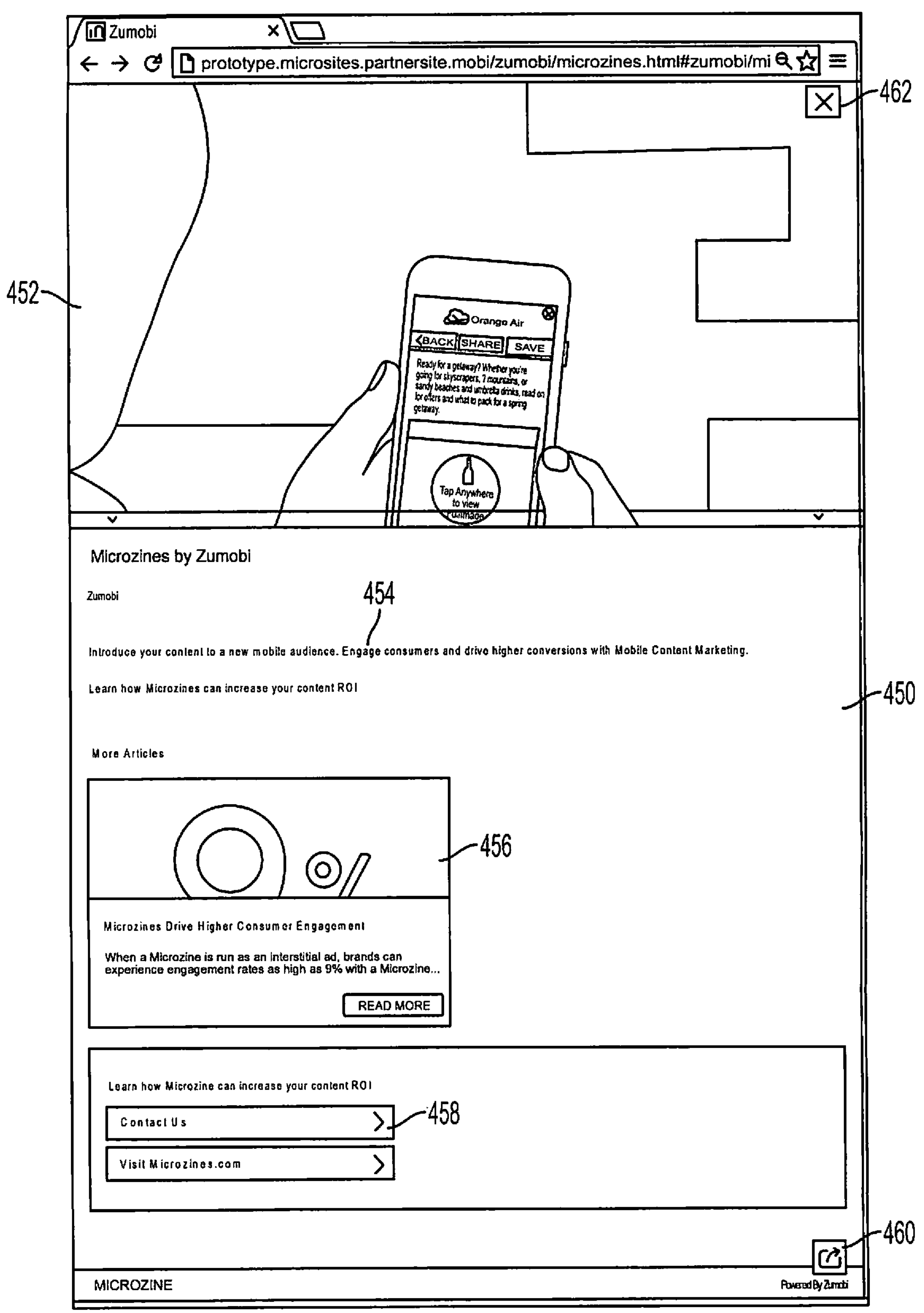

Each of article icons 402*a-d* may be a selectable icon that, when selected, may display the respective article in a portion of GUI 120. As seen in FIG. 4B, article 450 is displayed on portion of GUI 120. Although FIG. 4B shows article 450 as occupying the entirety of GUI 120, in some aspects, article 450 may be displayed on a portion of GUI 120 that is less than the entire GUI display (e.g., in a pop-up style rendering). It is noted that article 450 is displayed on GUI 120 in the integrated mobile graphical media experience provided by the system, without a need to exit the integrated mobile graphical media experience to access the source platform from where the content of article 450 originated.

As further shown in FIG. 4B, article image 452 and article content 454 are included in article 450. As discussed above, article image 452 and article content 454 have been optimized for inclusion in the integrated mobile graphical media experience. Moreover, the format and layout of article 450 is determined by templates used in rendering module 206, as discussed above. It is noted that the format and layer of any of multiple articles in the integrated mobile graphical media experience will have the same format, regardless of the source platform or the original format of the content.

As further shown in FIG. 4B, related article 456 may be presented in the integrated mobile graphical media experience in accordance with the present disclosure and as discussed above. Additionally, article 450 may include share link 460, which may enable a user of the integrated mobile graphical media experience to share article 450 on any of multiple social media, email, and/or other sharing platforms. In some aspects, a link (not shown) to the original source of the compiled-content of article 450 may be included in article 450. Closing button 462 enables a user to close article 450 and return to the main section of the integrated mobile graphical media experience, as shown in FIG. 4A.

Article 450 may also include call-to-action 458. In some aspects, call-to-action 458 may be a link for more information related to the article, or may be shoppable content. Shoppable content may provide a user of the integrated mobile graphical media experience with a link to purchasable products or services featured in the content of article 450. For example, an article with a video review of a particular backpack may include, as call-to-action 458, as link to purchase the particular backpack. In some aspects, such a call-to-action may be included as selectable content displayed on the article icons 402*a-d* of the main section of the integrated mobile graphical media experience.

Referring back to FIG. 4A, GUI 120 may include home screen button 430, which enables a user to load the main page of the mobile graphical media experience. Additionally, favorites button 440 enables the user to view the articles the user has favorited within the mobile graphical media experience, and to provide direct access to those articles. In some aspects, article icons 402*a-d* may include thumbnails generated from the compiled-content, or provided by other sources. The thumbnails may include videos clips generated from the compiled-content. In some aspects, the thumbnails may function as embedded players for the video clips.

Figure 5:
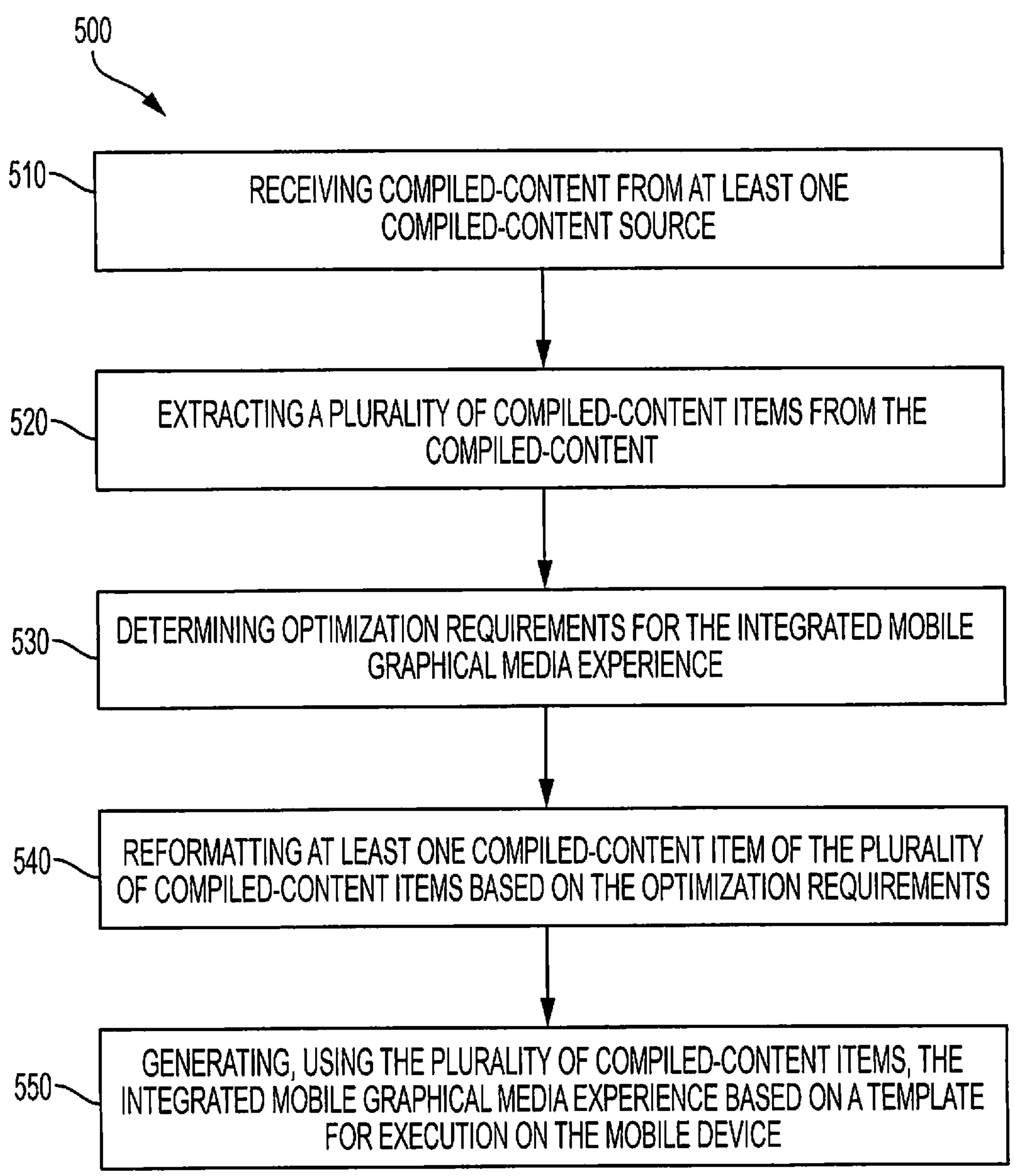
FIG. 5 is a flow diagram illustrating aspects of a method of generating an integrated mobile graphical media experience for execution in a mobile device.

FIG. 5 shows a flow diagram illustrating aspects of a method of generating an integrated mobile graphical media experience for execution in a mobile device shown as method 500. In an aspect, method 500 may be performed by integration and optimization engine 148 of server 140 of FIG. 1 and FIG. 2. At 510, method 500 includes receiving compiled-content from at least one compiled-content source. In aspects, the compiled-content may be associated with a topic of the integrated mobile graphical media experience. At 520, the method includes extracting a plurality of compiled-content items from the compiled-content. In some aspects, the type of source of the at least one compiled-content source may include a social media stream, a blog publisher, a video source, a news source, a web server, a media server, and/or an RSS feed.

At 530, the method includes determining optimization requirements for the integrated mobile graphical media experience. In some aspects, the optimization requirements may be requirements related to bandwidth and/or storage limits of the mobile device or of server 140. At 540, the method includes reformatting at least one compiled-content item of the plurality of compiled-content items based on the optimization requirements. At 550, the method includes generating, using the plurality of compiled-content items, the integrated mobile graphical media experience based on a template for execution on the mobile device. In some aspects, the generating the integrated mobile graphical media experience may comprise generating a plurality of articles, and each article in the plurality of articles may correspond to a respective compiled-content item of the plurality of compiled-content items.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A system for optimizing and integrating compiled-content provided from at least one compiled-content source to generate an integrated mobile graphical media experience executed in a mobile device, the system comprising:

one or more processors in the mobile device; and a memory, coupled to the one or more processors, wherein the memory includes code stored therein that is executable by the processors to cause the mobile device to:

integrate the compiled-content into a single platform to provide a seamless integration of multiple sources of the compiled-content so that accessing the compiled-content, including video content, obtained from the multiple sources does not require individually accessing the compiled-content from each source platform originally associated with the compiled-content;

extract compiled-content items from the at least one compiled-content source, the compiled-content items comprising items having a plurality of data formats, wherein the data formats are content types including video, audio, and text content types, and the integrated compiled content items are individually accessible;

reformat the compiled-content items in accordance with a template to optimize display of the compiled-content items by the mobile device, wherein the template defines a layout of the compiled-content items based on the data formats of the compiled-content items;

generate, using reformatted compiled-content items, the integrated mobile graphical media experience in accordance with the layout defined by the template based on the data format for execution on the mobile device, wherein the integrated mobile graphical media experience includes a plurality of display items, each display item in the plurality of display items corresponding to one of the compiled-content items, the template further defining a layout of the plurality of display items on the integrated mobile graphical media experience based on the data formats of the reformatted compiled-content items corresponding to each display item in the plurality of display items;

parse the compiled-content items to facilitate keyword analysis of the compiled-content items, wherein the keyword analysis identifies keyword tags that are additional to any tag originally included in the compiled-content items, and wherein a context of the identified keyword tags is related to the integrated mobile graphical media experience;

guide an AI platform to analyze the parsed compiled-content to generate a compiled-content keyword and taxonomy map that is within a context of the mobile graphical media experience;

use the AI generated compiled-content keyword and taxonomy map to identify additional compiled-content related to the parsed compiled-content so that the additional compiled-content is not tied to an original context of the parsed compiled-content but instead is within the context of the mobile graphical media experience; and optimize the compiled-content items to reduce an amount of video data to comply with mobile device bandwidth limits while maintaining a video format.

2. The system of claim 1, where the compiled-content includes owned-content.

3. The system of claim 1, wherein the predetermined optimization requirements are requirements related to at least one of bandwidth limits and storage limits.

4. The system of claim 3, wherein the at least one of the bandwidth limits and the storage limits are limits of the mobile device or of the system.

5. The system of claim 3, wherein the predetermined optimization requirements are expressed as threshold values, and wherein the reformatting the compiled-content items based on predetermined optimization requirements includes reformatting the compiled-content items such that the integrated mobile graphical media experience has a size less than a predetermined size.

6. The system of claim 1, wherein the layout defined by the template defines at least one of a number of display items corresponding to compiled-content items of a particular data format to be included in the integrated mobile graphical media experience, and a location of display items corresponding to the compiled-content items of a particular data format within the integrated mobile graphical media experience.

7. The system of claim 1, wherein the at least one compiled-content source includes a plurality of compiled-content sources, and wherein each of the compiled-content sources is of a type selected from a group consisting of a social media stream, a blog publisher, a video source, a news source, a web server, a media server, and a Rich Site Summary (RSS) feed.

8. The system of claim 1, further comprising a storage and distribution module configured to store the integrated mobile graphical media experience, and to distribute the integrated mobile graphical media experience to the mobile device.

9. The system of claim 8, wherein the distributing the integrated mobile graphical media experience to the mobile device is performed using a third-party content delivery system, whereby the storing of the integrated mobile graphical media experience is decoupled from the distributing the integrated mobile graphical media experience.

10. The system of claim 1, wherein the keyword analysis of the compiled-content items is used to identify additional compiled-content items from the at least one compiled-content source related to the parsed compiled-content items.

11. The system of claim 1, wherein the keyword analysis of the compiled-content items is performed by an intelligent analysis platform.

12. The system of claim 1, further comprising a metrics database for storing metrics associated with at least one interaction event, wherein the at least one interaction event is generated when a user interacts with the compiled-content items of the integrated mobile graphical media experience, and wherein the metrics indicate a performance of the compiled-content.

13. The system of claim 12, wherein the metrics are used in identifying additional compiled-content items that are deemed relevant to the user based on the metrics.

14. The system of claim 12, wherein the metrics include at least one of a number of views of a display item of the integrated mobile graphical media experience, a duration of the user view of the display item, an engagement activity of the user with the display item, a selection of shoppable-content within the display item, and a user rating associated with the display item.

15. A method of generating an integrated mobile graphical media experience for execution in a mobile device, the method comprising:

integrating compiled-content into a single platform to provide a seamless integration of multiple sources of the compiled-content so that accessing the compiled-content, including video content, obtained from the multiple sources does not require individually accessing the compiled-content from each source platform originally associated with the compiled-content;

receiving the compiled-content from at least one compiled-content source, wherein the compiled-content is associated with a topic of the integrated mobile graphical media experience;

extracting a plurality of compiled-content items from the at least one compiled-content source, the plurality of compiled-content items comprising items having a plurality of data formats, wherein the data formats are content types including video, audio, and text content types, and the integrated compiled content items are individually accessible;

determining optimization requirements for the integrated mobile graphical media experience;

reformatting compiled-content items of the plurality of compiled-content items in accordance with a template to optimize display of the compiled-content items by the mobile device, wherein the template defines a layout of the compiled-content items based on the data formats of the compiled-content items;

generating, using the plurality of compiled-content items including each of the reformatted compiled-content items, the integrated mobile graphical media experience in accordance with the layout defined by the template based on the data format for execution on the mobile device, wherein the generating the integrated mobile graphical media experience comprises generating a plurality of display items, each display item in the plurality of display items corresponding to a respective compiled-content item of the plurality of compiled-content items, the template further defining a layout of the plurality of display items on the integrated mobile graphical media experience based on the reformatted respective compiled-content items corresponding to each display item in the plurality of display items; and parsing the plurality of compiled-content items to facilitate keyword analysis of the plurality of compiled-content items, wherein the keyword analysis identifies keyword tags that are additional to any tag originally included in the plurality of compiled-content items, and wherein a context of the identified keyword tags is related to the integrated mobile graphical media experience; and guiding an AI platform to analyze the parsed compiled-content to generate a compiled-content keyword and taxonomy map that is within a context of the mobile graphical media experience;

using the AI generated compiled-content keyword and taxonomy map to identify additional compiled-content related to the parsed compiled-content so that the additional compiled-content is not tied to an original context of the parsed compiled-content but instead is within the context of the mobile graphical media experience; and optimizing the compiled-content items to reduce an amount of video data to comply with mobile device bandwidth limits while maintaining a video format.

16. The method of claim 15, wherein the layout defined by the template defines at least one of a number of display items corresponding to compiled-content items of a particular data format to be included in the integrated mobile graphical media experience, and a location of display items corresponding to compiled-content items of a particular data format within the integrated mobile graphical media experience.

17. The method of claim 15, wherein receiving compiled-content from at least one compiled-content source, wherein the compiled-content is associated with a topic of the integrated mobile graphical media experience comprises:

receiving compiled-content from a plurality of compiled-content sources, wherein the compiled-content is associated with a topic of the integrated mobile graphical media experience.

18. The method of claim 17, wherein the plurality of compiled-content sources are of different types, and wherein the different types include at least one of a social media stream, a blog publisher, a video source, a news source, a web server, a media server, and a Rich Site Summary (RSS) feed.

19. The method of claim 15, further comprising:

determining that new compiled-content related to the topic is available from the at least one compiled-content source; and dynamically updating the integrated mobile graphical media experience to include additional display items corresponding to compiled-content items in the new compiled-content.

20. The method of claim 15, further comprising:

capturing at least one interaction event, the at least one interaction event generated when a user interacts with at least one compiled-content item of the plurality of compiled-content items of the integrated mobile graphical media experience;

generating metrics associated with the at least one interaction event;

storing the metrics in a metrics database; and determining, based on the metrics, a performance of the at least one compiled-content item of the plurality of compiled-content items of the integrated mobile graphical media experience.

21. The method of claim 20, further comprising identifying, based on the performance of the at least one compiled-content item of the plurality of compiled-content items, additional compiled-content items that are deemed relevant to the user based on the metrics.

22. The method of claim 15, wherein the integrated mobile graphical media experience includes a call-to-action, the call-to-action including shoppable content related to the topic of the compiled-content of at least one display item of the integrated mobile graphical media experience.

* * * * *